Sept. 9, 1969     M. ORAIN     3,466,067
DETACHABLE CONNECTION BETWEEN A FLEXIBLE
TUBE AND A RIGID TUBULAR MEMBER
Original Filed April 5, 1965
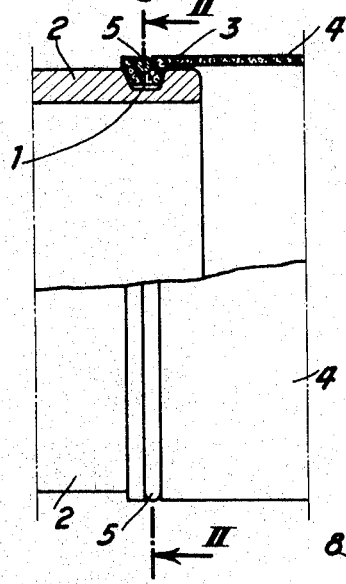
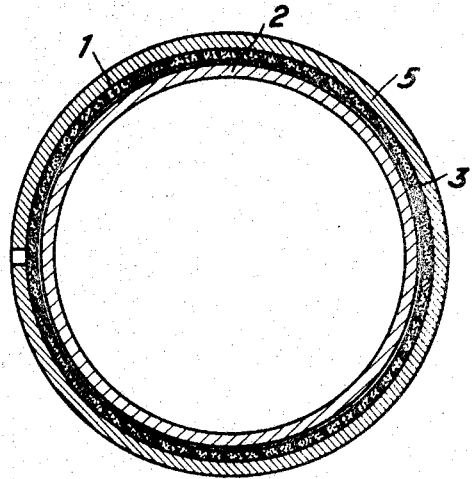
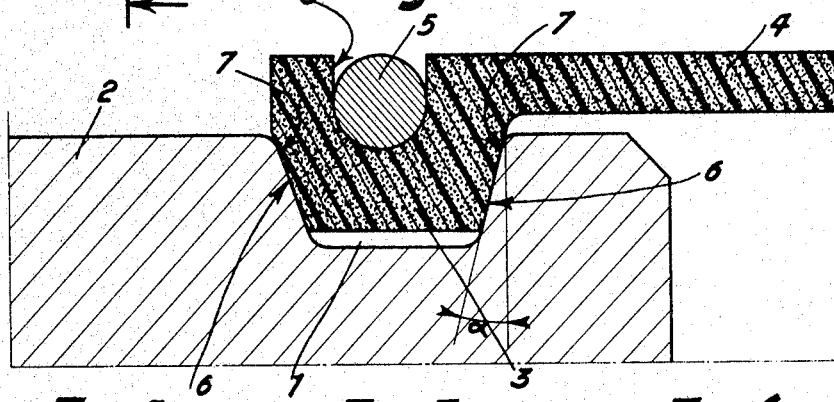
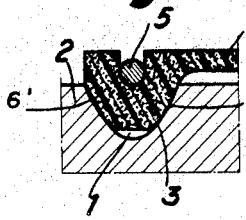 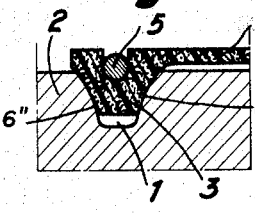 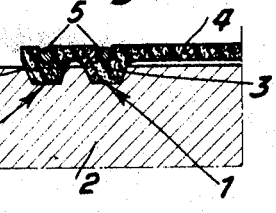
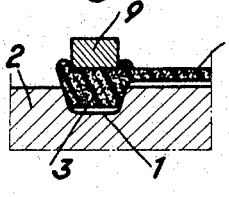 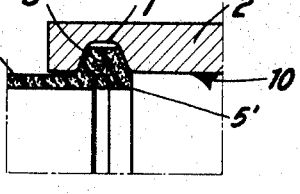
Inventor:
Michel Orain
BY Baldwin & Wight
Attorneys 3,466,067
DETACHABLE CONNECTION BETWEEN A
FLEXIBLE TUBE AND A RIGID TUBULAR
MEMBER
Michel Orain, Courbevoie, France, assignor to Glaenzer
Spicer Societe Anonyme, Poissy, Yvelines, France, a
corporation of France
Continuation of application Ser. No. 445,349, Apr. 5,
1965. This application Aug. 14, 1968, Ser. No. 754,109
Claims priority, application France, Apr. 8, 1964,
970,131
Int. Cl. F16l 33/00, 31/00, 47/00
U.S. Cl. 285—244                                7 Claims

ABSTRACT OF THE DISCLOSURE

This disclosure relates to a coupling between a flexible tubular member and a rigid tubular member. The rigid tubular member is provided with an annular groove and the flexible member is provided with an annular bead, generally complementally shaped with respect to the groove and receivable therein. Adjacent sidewalls of the groove and bead are inclined at a small angle to facilitate a wedging of the bead within the groove, and in the connected condition of the flexible and tubular members, an annular void is provided at the bottom of the annular groove, which is unfilled by the annular bead, in order that resilient tangential tension forces maintain the bead urged into wedging contact within the groove. The flexible member is provided with a resilient ring completely housed within the bead, also for urging the bead into wedging engagement within the groove.

This application is a continuation of application Serial No. 445,349 filed Apr. 5, 1965 and now abandoned.

This invention relates to a system of detachable connection between a flexible tube or pipe and a rigid part, such as a tube or pipe.

Very numerous devices are already known which permit the detachable connection of a flexible pipe to a rigid pipe or other part allowing the passage of a fluid.

The invention has as object a system permitting such connections, particularly when the fluid to be distributed is subjected only to low pressure.

Compared with existing devices this system has the great advantage of combining the following properties:

(a) It permits instantaneous connection and disconnection;

(b) It requires no special verification or equipment for installation;

(c) The tightness of the connection is complete and durable;

(d) Its dimensions are extremely small and it retains an external volume of revolution of an outer tubular part by remaining free of projections caused by clamping members;

(e) It safeguards the flexible tube connected, even if it is subjected to alternating stresses and vibrations;

(f) It retains all the foregoing qualities even after any number of connections and disconnections;

(g) Finally, its cost price is very low.

The system of connection between a flexible tube and a rigid part forming the subject of the invention comprises an annular groove formed in the rigid part, for example a tube, the two flanks of said groove widening out radially from a bottom having a given width and said groove co-operating with a circular bead formed at the end of the flexible tube or pipe, said bead having a section of complementary shape to that of the groove in the rigid body and having flanks widening out radially from an annular face having a greater width than that of the bottom of the said groove, means being provided to grip said bead in said groove in the connected position. Thus, this bead or heel can engage in said groove or furrow in the second tube by simple engagement of the end of one of the tubes or pipes on the end of the other and pushing the first towards the second, the tightness of the coupling being obtained by the pressure of the flanks of the bead on the flexible tube on the flanks of the groove in the rigid body.

The pressure providing the tightness of the coupling may originate from the elastic tangential tension of the flexible tube and/or from the radial compression applied to the end of the flexible tube by an elastic retainer or ring.

The tube carrying the bead may be provided with an annular groove on its oposite surface to said bead, said groove being intended to receive the elastic ring.

The circular groove may be provided on the outside of the rigid part or tube and the bead on the inside of the flexible tube or pipe, or inversely, the elastic ring or retainer, if provided, occupying a corresponding position.

Various forms of construction of the connection system forming the subject of the invention are described below by way of simple example without limitation and with reference to the accompanying drawings, in which:

FIGURE 1 shows, partly in longitudinal section, two assembled tubes according to the invention;

FIGURE 2 is a section along the line II—II in FIGURE 1;

FIGURE 3 is a section on a larger scale of a detail of the junction between the flexible tube and the rigid tube;

FIGURES 4 and 5 illustrate two alternative constructions;

FIGURE 6 illustrates another alternative construction in which the elements to be assembled are provided with two locking means;

FIGURE 7 illustrates another embodiment;

FIGURE 8 illustrates an embodiment in which the flexible tube is inserted into the rigid tube or part.

As illustrated in FIGURES 1 to 3, the connection system forming the subject of the invention consists of an annular groove 1 provided on the end of the rigid tube 2, and of a bead or heel 3 provided at the end of the flexible tube 4 and inserted by force into the groove 1 under the effect of the elastic tangential tension existing in the tube 2 or as the result of the radial compression produced by an elastic retainer or ring 5, or else as the result of these two means together.

In order to obtain this result, the heel 3 provided on the elastic tube 4 has a smaller diameter than its support diameter after installation.

The ring 5, which may be of spring steel, is likewise manufactured with a smaller diameter than its support diameter in the groove in the elastic tube.

The radial gripping resultant produced by the tangential tension of the heel 3 and by the radial pressure of the elastic ring 5 is balanced by the pressure of the flanks 6 of the groove 1. Since the angle $\alpha$ is small, this results in a wedging effect producing considerable gripping all along the edges 7 of the heel 3 against the flanks 6 of the groove 1 provided in the rigid tube. Consequently, perfect double tightness is obtained despite a moderate radial gripping force.

It should be observed that the circumferential tension in the elastic tube 4 must not exceed a certain value if the risk of the fracture of the tube is to be avoided. In addition, the radial compression applied by the ring 5 is limited by the conditions of flexibility necessary for its installation, requiring considerable radial expansion. It is therefore only through the effect of the wedging produced by forcing the heel 3 into the groove 1 that the pressures become sufficient on the surfaces of the flanks 6 to provide complete tightness of the connection. The ring 5 is not necessary, but its cost price is very low. Moreover, it does not substantially increase the dimensions of the connections if a groove 8 intended to receive it is provided at the end of the flexible tube 4. Finally, if the circumferential tension in the elastic tube should be relaxed, the ring will by itself provide sufficient radial pressure to produce the aforesaid wedging effect and ensure the tightness of the connection.

The circular furrow or groove 1 may have a substantially trapezoidal section, the two flanks 6 of which have a tapering slope with an angle $\alpha$ of about 10 degrees in a radial direction, as shown in FIGURE 3.

Nevertheless, it is possible to give the groove 1 a section having concave flanks 6' (FIGURE 4) or having convex flanks 6" (FIGURE 5).

It is obviously possible to juxtapose a plurality of grooves 1 and heels 3 respectively on the two tubes or parts, as shown in FIGURE 6.

In cases where the flexible tube 4 is placed on the outside of the rigid tube or part 2, the ring or rings 5 reinforcing the radial grip may be replaced by one or more elastic rings 9 (FIGURE 7) of elastomer having similar or different characteristics to those of the flexible tube 4.

These elastic rings 9 may also be replaced by rings of material having little elasticity, such as: steel, brass, nylon, etc. and be mounted by force on the neck of the flexible tube after the style of ferrules, without departing from the scope of the present invention. If the space available around the sealing device is sufficient, it is also possible, without departing from the scope of the invention, to replace the elastic rings in FIGURE 7 by screw clamp collars of known type.

In the examples illustrated in FIGURES 1 to 7, the flexible tube 4 engages over the rigid tube or part 2, but it is obviously possible to conceive the opposite arrangement, that is to say the flexible tube 4 would then be provided with a circular heel 3' (FIGURE 8) situated on the outside of the tube and adapted to be engaged in a groove 1' provided in a bore 10 in the rigid part 2. An elastic ring 5' may likewise be used, applying an expansive force.

It will be realised that numerous modifications of shape and detail may be made to the above described system, without thereby departing from the spirit of the invention.

I claim:
1. A detachably connectable flexible coupling comprising a flexible tubular member and a rigid tubular member, said rigid tubular member having an annular groove opening radially through a peripheral surface thereof, said flexible member having a terminal end portion which is of a materially greater thickness than a remaining portion defining the major length of said flexible member, an annular radially projecting bead defined by said thickened terminal end portion, said annular bead being engaged in said groove, said groove having a bottom surface of given width and sidewalls widening out radially from said bottom surface, said bead both when engaged in and when removed from said groove having a cross-sectional shape generally complementary to that of the groove with bead sidewalls which widen out radially from a bead annular bottom surface of greater axial width than the width of said groove bottom surface, leaving an annular void between said groove bottom surface and said bead bottom surface in both compressed and non-compressed conditions of said annular bead, the diameters of said peripheral surface and the bead annular bottom surface being of materially different sizes whereby said flexible member is temporarily distorted during assembly and said bead automatically seats in said groove upon the rebounding of said flexible member from its temporarily distorted condition, said peripheral surface of said rigid tubular member being spaced from a peripheral surface of said flexible tubular member axially outward of said groove and bead thereby forming a circumferential gap between said peripheral surfaces, and means axially spaced from said circumferential gap and upon said annular bead for compressing said bead in said groove in a connected position.

2. The coupling as defined in claim 1 wherein said flexible member is disposed radially inwardly of said rigid member, and said annular bead is directed radially outwardly.

3. The coupling as defined in claim 1 wherein said flexible member is disposed radially outwardly of said rigid member, and said annular bead is directed radially inwardly.

4. The coupling as defined in claim 2 wherein said compressing means comprises a resilient annular ring positioned radially opposite said bead bottom surface.

5. The coupling as defined in claim 3 wherein said compressing means comprises a resilient annular ring positioned radially opposite said bead bottom surface.

6. The coupling as defined in claim 4 wherein said groove has generally arcuate curved sidewalls.

7. The coupling as defined in claim 5 wherein said groove has generally arcuate curved sidewalls.

References Cited
UNITED STATES PATENTS

| | | | |
|---|---|---|---|
| 331,170 | 11/1885 | Thompson | 285—109 |
| 1,829,236 | 10/1931 | Perkins. | |
| 2,261,948 | 11/1941 | Beach | 285—49 |
| 2,310,877 | 2/1943 | Sperry. | |
| 2,433,602 | 12/1947 | Coss. | |
| 2,889,089 | 6/1959 | Herrick et al. | |
| 3,047,025 | 7/1962 | Davis. | |
| 3,134,519 | 5/1964 | Tidd | 285—238 X |
| 3,211,475 | 10/1965 | Freed et al. | 285—229 |
| 3,228,714 | 1/1966 | Dricken. | |

FOREIGN PATENTS

| | | |
|---|---|---|
| 835,239 | 3/1952 | Germany. |
| 818,250 | 8/1959 | Great Britain. |
| 855,906 | 12/1960 | Great Britain. |

THOMAS F. CALLAGHAN, Primary Examiner

U.S. Cl. X.R.

285—259